Figure 1:
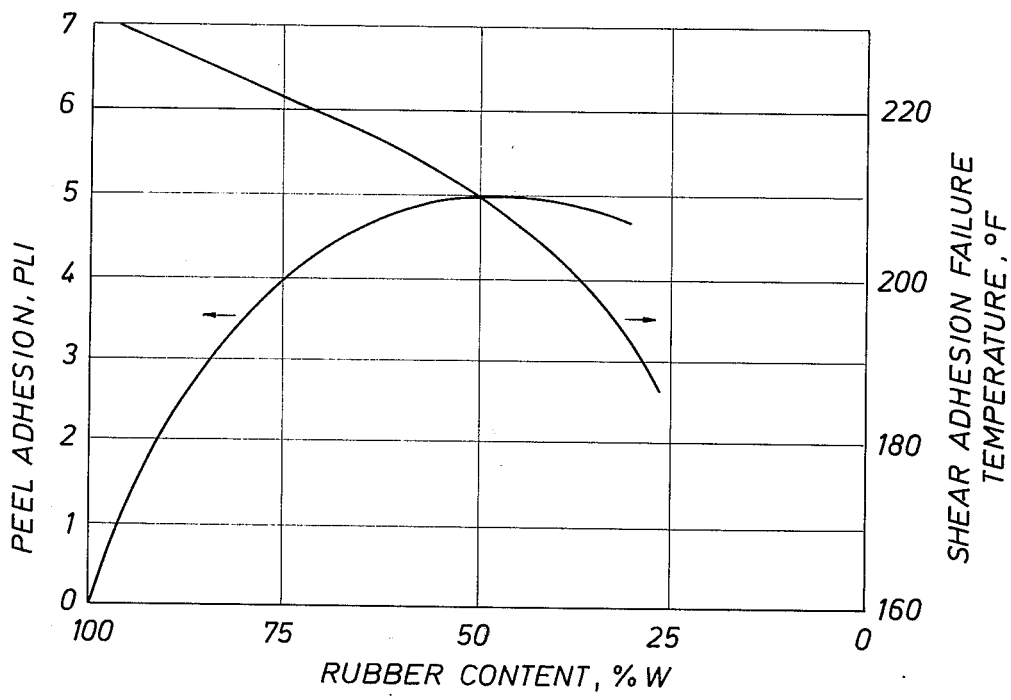

United States Patent [19]
Robertson

[11] 3,935,338
[45] Jan. 27, 1976

[54] PROCESS FOR THE PREPARATION OF PRESSURE-SENSITIVE ADHESIVE ARTICLES

[75] Inventor: William J. Robertson, Ronald K. Crossland, and James T. Harlan Jr., all of San Marino, Calif.

[73] Assignee: Shell Oil Company, Houston, Tex.

[22] Filed: Apr. 23, 1973

[21] Appl. No.: 353,865

[52] U.S. Cl. ............. 427/207; 427/314; 427/398; 428/40
[51] Int. Cl.² .............................................. C09J 7/04
[58] Field of Search .... 117/122 PA, 122 PF, 122 P, 117/68.5, 76 A, 161 A, 111 A, 111 D, 102 R

[56] References Cited
UNITED STATES PATENTS

| | | | |
|---|---|---|---|
| 3,239,478 | 3/1966 | Harlan | 260/27 |
| 3,496,012 | 2/1970 | Biorseth | 117/111 |
| 3,592,710 | 7/1971 | Yurgen et al. | 156/153 |
| 3,635,861 | 1/1972 | Russell | 260/829 X |
| 3,676,202 | 7/1972 | Korpman | 117/122 X |
| 3,723,170 | 3/1973 | Korpman | 117/122 X |

Primary Examiner—Bernard D. Pianalto

[57] ABSTRACT

Pressure-sensitive adhesive compositions having an improved set of physical properties especially at elevated temperatures yet having low melt viscosity and thus capable of being applied by means of a wipe-off coater comprise certain block copolymers, resins compatible with a rubbery phase of said copolymers, extender oil and resins compatible with the plastic blocks having softening points higher than those of the plastic polymer blocks of the copolymer.

5 Claims, 5 Drawing Figures

PROCESS FOR THE PREPARATION OF PRESSURE-SENSITIVE ADHESIVE ARTICLES

BACKGROUND OF THE INVENTION

Block copolymers have been formulated to produce a number of types of adhesive compositions. The basic patent in this field, Harlan, U.S. Pat. No. 3,239,478, shows combinations of block copolymers with tackifying resins and oils to produce a wide spectrum of adhesives. While these are suitable for many purposes, the prior art compositions are usually deficient in one physical property or another leaving something to be desired for specific applications. In many cases, the deficiency lies in the area of high temperature properties. For example, Russell, U.S. Pat. No. 635,861 shows hot melt adhesives comprising block polymer, certain resins and oil. However, the high temperature properties of the described adhesive compositions are deficient.

It would be desirable to be able to apply an adhesive to a backing in the form of a melt, but if viscosity-reducing components are absent, the melt is then of such high viscosity that the equipment normally available for this purpose cannot handle the composition. An example of this is shown in Korpman, U.S. Pat. No. 3,676,202, which describes a 2-component blend of certain block copolymers with a particular type of tackifying resin. However, the compositions described by Korpman are clearly oil-free and consequently would be difficult to apply to the tape in the form of a melt. They could be applied readily in the form of a solution as shown in Korpman's working examples. However, solvents add to the expense of the operation, increase fire hazards, and require expensive recovery equipment to avoid air pollution.

OBJECT OF THE INVENTION

It is an object of the present invention to provide an improved process for applying adhesive compositions. It is a particular object of the invention to provide an improved process for applying pressure-sensitive adhesives comprising certain block copolymers. It is a further object of the invention to provide a particular process for using compositions which have a low enough viscosity to be applied in the form of a hot melt but which retain or have enhanced pressure-sensitive adhesive properties even at elevated temperatures. Other objects will become apparent during the following detailed description of the invention.

STATEMENT OF THE INVENTION

Now, in accordance with the present invention, a process is provided for application of a pressure-sensitive adhesive to a substrate which comprises forming a hot melt which comprises the following components and applying the melt to a substrate by means of a wipe-off coater:

|  | PHR |
|---|---|
| Block copolymer as described hereinafter | 100 |
| Tackifying resin compatible with the elastomeric block of the copolymer | 50–200 |
| Reinforcing resin having a softening point at least 20°C higher than that of the thermo-plastic blocks of the block copolymer | 25–100 |
| Extending oil | 25–100 |

Figure 2:
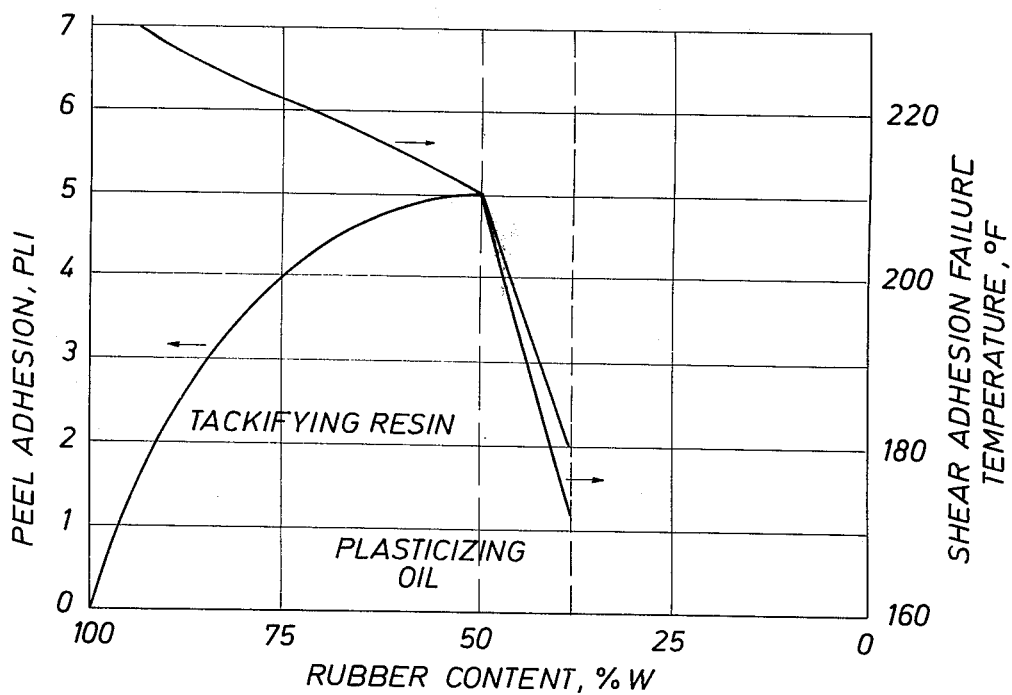
Figure 3:
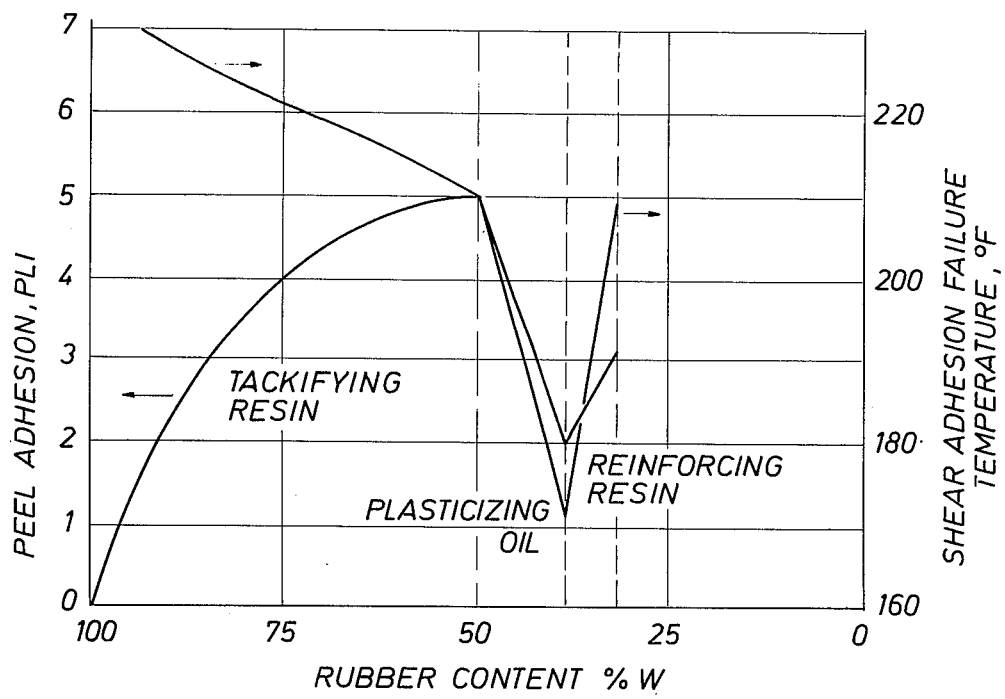
Figure 4:
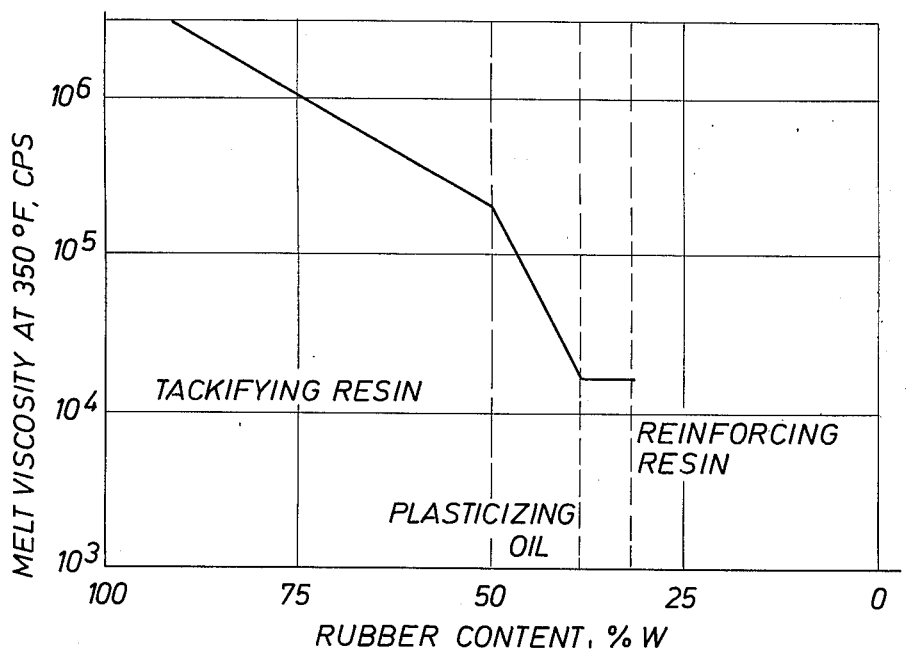

An example leading to the compositions to be used in the process of the present invention is illustrated in FIGS. 1-4 forming a part of this specification. FIG. 1 shows a two-component composition comprising a block copolymer blended with a tackifying resin. FIG. 2 shows the loss of adhesive properties by the addition of an extender oil to the composition. FIG. 3 illustrates how the adhesive properties can be restored by the addition of a reinforcing resin to the compositions illustrated in FIG. 2. FIG. 4 shows the melt viscosities of compositions coming within the scope of the present invention.

While the application of adhesive compositions as an extruded hot melt film deposited on a backing has been proposed, difficulties are encountered when the composition comprises a substantial proportion of the block copolymers described herein. Due to the elastic nature of the compositions, phenomena such as neck-in, surging and edge-thickening are experienced when ordinary extrusion methods are utilized, such as that described in U.S. Pat. No. 3,592,710. Neck-in results in the adhesive layer being much more narrow than the extrusion die width and, due to this edge retraction, also causes thickening of the final edges. Surging is an unstable condition in the film as it comes out of the die. This condition causes a variable coating thickness that is unacceptable.

According to the process of the present invention, the composition described herein enables application to a substrate by which the substrate is pulled directly across the upturned die lips of a hot melt extruder. The rate at which the adhesive composition is fed to the die and the rate at which the substrate is pulled across the die face largely determine the thickness of the composition.

Figure 5:
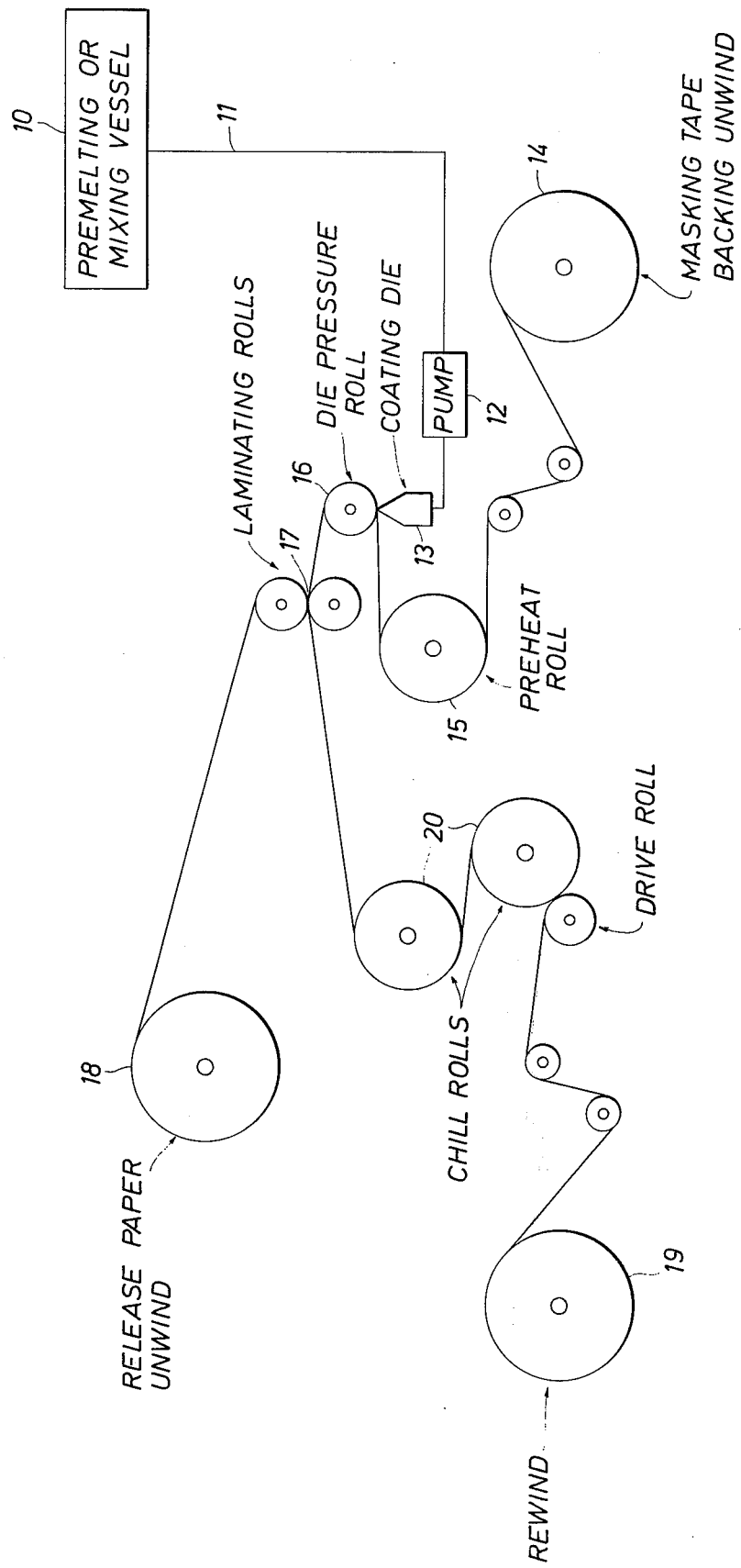

A suitable apparatus for carrying out this process is shown schematically in FIG. 5.

According to FIG. 5, the adhesive composition is prepared as a hot melt in the premelting or mixing vessel 10. This hot melt is then passed through line 11 by means of pump 12 to the upturned coating die 13. A suitable substrate, such as a masking tape stock, is unwound from reel 14 and heated to a desirable level such as by passage over preheat roll 15. This preheated stock is then positioned by die-pressure roll 16 directly above the upturned coating die 13 so that it wipes off a layer of the composition having a predetermined thickness. The coated stock can be laminated between laminating rolls 17 with a release paper fed from a source 18, after which the product is sent to a storage roll, preferably after passing over chill rolls 20.

The block copolymers forming the most important component of the present compositions have at least two monoalkenyl arene polymer blocks and at least one elastomeric conjugated diene polymer block. The number of blocks in the block copolymer is not of special importance and the macromolecular configuration may be either linear or radial dependent upon the method by which the block copolymer was formed. Typical block copolymers of the most simple configuration would have the structure polystyrene-polyisoprene-polystyrene, and polystyrene-polybutadiene-polystyrene. A typical radial polymer would comprise one in which the diene block had three or more branches, the tip of each branch being directly connected to a polystyrene block. Other useful monoalkenyl arenes from which the thermoplastic (non-elastomeric) blocks may be formed include alphamethyl styrene, tertiary butyl styrene and other ring alkylated styrenes as well as mixtures of the same.

The average molecular weights of each of the blocks may be varied. The monovinyl arene polymer blocks preferably have average molecular weights between about 7500 and 50,000, while the elastomeric center blocks may have average molecular weights between about 50,000 and 250,000. The average molecular weights of the polystyrene end blocks are determined by gel permeation chromatography using monodisperse polystyrene standards for calibration while the polystyrene content is measured by infrared spectroscopy of finished block polymer. The proportion of the thermoplastic monovinyl arene blocks should be between about 8 and 55 percent by weight of the block polymer, preferably between about 10 and 30 percent by weight.

The block copolymers useful in the compositions of this invention may be hydrogenated either selectively, randomly or completely. Two examples of such hydrogenated polymers are polyvinylcyclohexane-hydrogenated polyisoprene-polyvinylcyclohexane and polystyrene-hydrogenated polyisoprene-polystyrene. Polyvinylcyclohexane describes the polymer resulting from fully hydrogenating polystyrene.

If the block copolymers are combined with a tackifying resin as suggested by Korpman, a series of binary compositions may be obtained as illustrated in FIG. I. It will be noted according to that Figure that as the tackifying resin content is increased the peel adhesion increases to a maximum at the point where the resin and block polymer are present in about equal proportions. During this time, however, the shear adhesion failure temperature progressively falls as the resin content is increased. The resin employed for this illustrative example was Wingtack 95, sold by Goodyear Tire and Rubber Company. This resin is described in South African Pat. No. 700,881 and is understood to be a thermoplastic tackifying resin essentially comprising a copolymer of piperylene and 2-methyl-2-butene having a softening point of about 95°C which results from the cationic polymerization of 60% piperylene, 10% isoprene, 5% cyclopentadiene, 15% 2-methyl butene and about 10% dimer.

Other tackifying resins of the same general type may be employed in which the resinous copolymer comprises 20–80 weight percent of piperylene and 80–20 weight percent of 2-methyl-2-butene. The resins normally have softening points (ring and ball) between about 80°C and about 115°C. Other tackifying resins which are especially suitable for use in the compositions of this invention include the following: rosin and rosin derivatives including hydrogenated rosins, esters of rosin, polyterpenes, terpenephenol resins, and polymerized mixed olefins.

While these compositions containing only block polymer and tackifying resin may be useful as adhesives, their melt viscosities are so high that the compositions could not be applied by commercially available equipment as hotmelts. Sufficient tackifying resin can be added to bring the viscosity of a binary system down to an acceptable level; however, this is achieved at the expense of shear adhesion failure temperature and adhesion. Consequently, as shown in FIG. 2, the binary compositions of FIG. 1 were modified by a plasticizing (extending) oil which was a rubber extending oil of petroleum origin comprising a naphthenic/paraffinic oil having a viscosity of about 430 SUS at 100°F, containing about 15 percent of aromatics and about 84.6 percent saturates by clay gel analysis.

As shown in FIG. 2, the addition of even a moderate amount of oil drastically reduced the peel adhesion and the shear adhesion failure temperature, thus indicating that such compositions would be unsatisfactory in many adhesive applications even though the addition of oil did, in fact, substantially reduce the viscosities of the hot melts derived therefrom.

Other rubber extending oils may be employed in the compositions of this invention. The following table describes suitable extending oils:

TABLE A

TYPICAL PLASTICIZING OILS FOR THERMOPLASTIC RUBBER

| Proprietary Name of Oil: | Polypropene-C-60 | Polybutene-16 | Tufflo 6206 | Tufflo 6056 | Tufflo 6026 | Kaydol |
|---|---|---|---|---|---|---|
| Hildebrand Solubility Parameter (8), hildebrands: | 6.55 | 6.95 | 7.06 | 7.18 | 7.29 | 7.34 |
| Average Mole Weight: | 800 | 600 | 660 | 550 | 410 | 480 |
| Carbon-Atom Analysis, %w | | | | | | |
| Aromatic Carbon Atoms: | 0 | 0 | 0 | 0 | 0 | 0 |
| Naphthenic Carbon Atoms: | 0 | 0 | 32 | 31 | 31 | 45 |
| Paraffinic Carbon Atoms: | 100 | 100 | 68 | 69 | 69 | 55 |
| Clay Gel Analysis | | | | | | |
| Asphaltenes: | 0 | 0 | 0 | 0 | 0 | 0 |
| Polar Compounds: | 0 | 0 | 0 | 0 | 0 | 0 |
| Aromatics: | 0 | 0 | 3.3 | 0.9 | 0 | 0 |
| Saturates: | 100 | 100 | 96.7 | 99.1 | 100 | 100 |
| Specific Gravity, 60/60°F: | 0.86 | 0.88 | 0.88 | 0.87 | 0.86 | 0.89 |
| Viscosity, 550 at 100°F: | 10,600 | 5,700 | 1,912 | 495 | 165 | 340 |
| Volatility, 22 hr/225°F,%w | 0.1 | 0.1 | 0.05 | 0.3 | 1.0 | — |
| Initial Boiling Point, °F: | — | — | 602 | 664 | 575 | 712 |
| Aniline Point, °F: | — | — | 276 | 254 | 233 | 230 |
| Color: | Colorless | lt. Yellow | Colorless | Colorless | Colorless | Colorless |
| UV Aging Resistance: | Good | Good | Good | Good | Good | Good |

| Proprietary Name of Oil: | Polybutene-6 | Tufflo 6016 | Tufflo 6204 | Tufflo 6094 | SHELLFLEX 371 | Tufflo 6014 |
|---|---|---|---|---|---|---|
| Hildebrand Solubility Parameter (8), hildebrands | 7.34 | 7.51 | 7.60 | 7.60 | 7.60 | 7.73 |
| Average Mole Weight: | 315 | 390 | 440 | 410 | 410 | 320 |

TABLE A-continued

TYPICAL PLASTICIZING OILS FOR THERMOPLASTIC RUBBER

| Proprietary Name of Oil: | Polypropene-C-60 | Polybutene-16 | Tufflo 6206 | Tufflo 6056 | Tufflo 6026 | Kaydol |
|---|---|---|---|---|---|---|
| Carbon-Atom Analysis, %w | | | | | | |
| Aromatic Carbon Atoms: | 0 | 0 | 0 | 0 | 2 | 0 |
| Naphthenic Carbon Atoms: | 0 | 31 | 56 | 57 | 44 | 57 |
| Paraffinic Carbon Atoms: | 100 | 69 | 44 | 43 | 54 | 43 |
| Clay Gel Analysis | | | | | | |
| Asphaltenes: | 0 | 0 | 0 | 0 | 0 | 0 |
| Polar Compounds: | 0 | 0 | 0 | 0 | 0.2 | 0 |
| Aromatics: | 0 | 0 | 8.1 | 8.0 | 13.2 | 0.1 |
| Saturates: | 100 | 100 | 91.9 | 92.0 | 86.6 | 99.9 |
| Specific Gravity, 60/60°F: | 0.84 | 0.85 | 0.92 | 0.92 | 0.90 | 0.89 |
| Viscosity, 550 at 100°F: | 134 | 85 | 1,850 | 880 | 429 | 95 |
| Volatility, 22 hr/225°F,%w | 10 | 2.0 | 0.5 | 0.8 | 0.9 | 12.0 |
| Initial Boiling Point, °F: | — | 561 | 450 | 610 | 710 | 535 |
| Aniline Point, °F: | — | 222 | 221 | 210 | 210 | 191 |
| Color: | Lt. Yellow | Colorless | Colorless | Colorless | Lt. Yellow | Colorless |
| UV Aging Resistance: | Good | Good | Good | Good | Moderate | Good |

The adhesive properties may be restored to the compositions illustrated in FIG. 2 by the addition of certain reinforcing resins while still maintaining a relatively low hot melt viscosity. The criterion for the reinforcing resin is that it be compatible with the monovinyl arene polymer blocks and that it have a softening point higher than that of said blocks, preferably at least 20°C higher and still more preferably having a ring and ball softening point between about 130°C and about 160°C. The use of the high softening point end-block compatible resin is illustrated in FIG. 3. It will be noted that the addition of such a resin restored the peel adhesion and the shear adhesion failure temperature so that the compositions were useful as pressure-sensitive adhesives even under hot conditions. Furthermore, as indicated in FIG. 4, this addition of reinforcing resin did not increase the melt viscosity of the compositions which had been modified previously with an extender oil. The resin used to illustrate this principle was a coumarone-indene resin having a softening point of about 155°C. The block copolymer employed in the compositions forming the basis for FIGS 1–4 had the structure polystyrene-polyisoprene-polystyrene with segmental molecular weights of 10,000–125,000–10,000.

I claim as my invention:

1. An improved process for making a pressure-sensitive adhesive article comprising the steps of
   a. mixing 100 parts by weight of a block copolymer of the groups consisting of block copolymers having at least two monoalkenyl arene polymer blocks A and at least one elastomeric conjugated diene polymer block B, said blocks A comprising 8–55 percent by weight of the copolymer and hydrogenated derivatives of the same, 50–200 parts by weight of a tackifying resin compatible with block B, 20–75 parts by weight of a reinforcing resin compatible with blocks A and having a softening point at least 20°C higher than that of blocks A, and 25–100 parts by weight of a hydrocarbon extending oil;
   b. heating the mixture to a fluid state;
   c. and wiping a moving substrate with the fluidized mixture, said wiping action being in the absence of solvents for the mixture and without film formation of the mixture prior to contact with the substrate.

2. A process according to claim 1 comprising
   a. a block copolymer having the configuration polystyrene-polyisoprene-polystyrene;
   b. a tackifying resin which comprises a resinous copolymer of 20–80 percent by weight of piperylene and 80–20 percent by weight of 2-methyl-2-butene having a softening point of from about 80°C to about 115°C.
   c. a reinforcing resin which comprises a coumarone-indene resin having a ring and ball softening point between about 130°C and about 160°C, and
   d. a rubber extending oil.

3. A process according to claim 1 wherein the block copolymer is one in which blocks A are polystyrene blocks and block B is a polyisoprene block.

4. A process according to claim 1 in which the tackifying resin comprises a resinous copolymer of 20–30 percent by weight of piperylene and 80–20 percent by weight of 2-methyl-2-butene having a softening point of from about 80°C. to 135°C.

5. A process according to claim 1 wherein the second resin comprises a coumarone-indene resin having a ring and ball softening point between about 130°C and about 160°C.

* * * * *